(12) United States Patent
Hsu et al.

(10) Patent No.: US 6,402,985 B1
(45) Date of Patent: Jun. 11, 2002

(54) METHOD FOR PREPARING EFFICIENT LOW VOLTAGE PHOSPHORS AND PRODUCTS PRODUCED THEREBY

(75) Inventors: David S. Y. Hsu, Alexandria, VA (US); Yongchi Tian, Princeton, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/531,159

(22) Filed: Mar. 17, 2000

(51) Int. Cl.[7] ............................................. C09K 11/00
(52) U.S. Cl. ...................... 252/301.14 R; 252/301.4 R; 252/301.4 P; 252/301.48; 252/301.5; 252/301.6 S; 252/301.6 F; 252/301.6 R; 252/301.6 P
(58) Field of Search .................. 252/301.4 R, 301.4 S, 252/301.4 P, 301.5, 301.6 R, 301.6 P, 301.6 S

(56) References Cited

U.S. PATENT DOCUMENTS 2,252,500 A * 8/1941 Fonda .................. 252/301.6 F
5,985,176 A * 11/1999 Rao ...................... 252/301.6 F

* cited by examiner

Primary Examiner—C. Melissa Koslow
(74) Attorney, Agent, or Firm—John J. Karasek; Stephen T. Hunnius

(57) ABSTRACT

Doped phosphors (e.g., metal orthosilicates) are made by adding solid particulate precursor to a solution of an alkoxide precursor and a dopant precursor before hydrolysis is allowed to occur. The mixture is then allowed to hydrolyze, resulting in a sol-gel condensation reaction. The solid particulate precursor can be fumed silica, and acts as a nucleation site for the sol-gel reaction product. After the sol-gel reaction, the mixture is dried and fired to form phosphors. The phosphors are especially suitable for applications in which there is low voltage operation.

10 Claims, 2 Drawing Sheets

METHOD FOR PREPARING EFFICIENT LOW VOLTAGE PHOSPHORS AND PRODUCTS PRODUCED THEREBY

BACKGROUND OF THE INVENTION

1. Field of the Invention

The present invention generally relates to methods for preparing cathodoluminescent phosphors using a sol-gel condensation technique, as well as to products made from these methods. In particular, the present invention relates to methods for preparing cathodoluminescent phosphors (e.g., orthosilicate-based phosphors) exhibiting superior brightness and efficiency, making them especially suitable for low voltage operation in various applications such as flat panel displays, field emitter displays (FEDs), electroluminescent displays (ELDs), TVs, and the like.

2. Description of the Background Art

Phosphors in general comprise a wide band gap semiconductor matrix with homogeneously dispersed activator ions within. Currently accepted mechanisms of light output in cathodoluminescence phosphors, though not well understood, include electron-induced creation of excitons, which can result in photon emission through recombination of the holes and electrons. However, lattice defects, impurities, charge traps, etc. can impede the efficient recombination of these charge carriers, thus causing the nonradiative decay of the excited states. It is believed that the phosphor crystal structure should be as close to perfect as possible to achieve efficient emission of light.

Current commercially-available cathodoluminescent phosphors are made for high voltage (i.e., approximately 5–20 kV) applications. On information and belief, a bright and efficient phosphors that are especially suited for low voltage operation (at or below about 1–6 kV, preferably 2–3 kV) do not exist in the prior art. Thus, it would be very desirable to provide cathodoluminescent phosphors having superior brightness and efficiency at low voltages (e.g., below about 2000 volts) for field emitter displays mainly due to the requirement of the very close proximity of the phosphor screen to the electron source (i.e., the field emitter arrays). Low bias voltages reduce the serious problems of electrical insulation breakdown and arcing.

Many conventional cathodoluminescent phosphors, such as those based on orthosilicates with grain sizes of a few micrometers, are prepared by mixing micron-sized or larger precursor particles and firing at high temperatures to induce solid reactions. For example, to make green Mn-doped zinc-orthositicate phosphors, particles of Mn-doped zinc oxide (ZnO) are mixed with $SiO_2$ particles and fired at high temperatures to produce the phosphor compound $Zn_2SiO_4$:Mn via solid reaction. The objective of this conventional method would be to cause homogeneous fusion of the precursor components, uniform incorporation of the activator (or dopant) species, and good crystal structure formation. However, due to the slowness of solid fusion/reactions, especially between large particles, good homogeneity is not easily achieved. Lattice defects and even non-stoichiometrical components can result, leading to poor semiconductor electronic band structures, including gap states that can easily cause nonradiative decay. Furthermore, portions that have an activator (e.g., Mn) deficiency can be formed, contributing to a "dead layer" that gives no light output. Other portions can potentially have excess amounts of the activator species which can quench each other, resulting in decreased light output.

U.S. Pat. No. 5,985,176 to Rao discloses $Mn^{2+}$ activated zinc orthosilicate phosphors having the empirical formula:

$$Zn_{(2-x)}Mn_xSiO_4$$

wherein $0.005 < x < 0.15$. The phosphors described in this patent are said to exhibit the properties of "improved brightness and decreased persistence" (column 3, lines 3–12) and are made by using the sol-gel process (column 3, lines 13–24 and column 5, line 7 to column 6, line 11). According to the patent, a high degree of homogeneity is achievable because the starting materials are mixed at the molecular level in a solution (column :3, lines 27–29). Unlike the present invention, however, this patent discloses the use of tetraethoxysilane (TEOS) instead of a solid precursor.

Commonly-owned, copending U.S. application Ser. No. 09/398,947, filed on Aug. 2, 1998, which is incorporated herein by reference for all purposes, discloses phosphor nanoscale powder prepared by forming a solution or slurry comprising phosphor precursors and then firing the solid residue of the solution or slurry. In Example I of the '947 application, a mixture of Zn and Mn(II) or Cu(II) precursors (e.g., zinc and manganese(II) acetates) is refluxed in ethanol to obtain a mixed solution of alkoxides/acetates of 1 wt. % Zn, with the amount of Mn being in the range of 1–4% with respect to the weight of Zn. The mixed alkoxide/acetate is then cooled and hydrolyzed with tetramethylammonium hydroxide to form a sol comprising of a suspension of mixed nanoparticles of metal oxides. After that, AEROSIL® fumed silica (7 nm in diameter, Degussa Corporation) is introduced into the sol to form a suspension of the particle precursors. Following ultrasonication, cooling, and drying, the resulting mixed gel is then pre-fired, cooled, ground, and fired. In contrast, in a typical embodiment of the present invention, a Zn-Mn alkoxide solution is first prepared from Zn and Mn alkoxide precursors without hydrolysis or forming particles. In fact, an inhibitor such as nitric acid is typically added to prevent premature (i.e., before introduction of the second precursor particles) precipitation of particles. The second precursor particles (e.g., fumed silica) are then added to the solution of the Zn-Mn alkoxide mixture, followed by induced precipitation of the first precursor by sol-gel condensation reaction, the precipitated first precursor being in intimate contact with and around the second precursor particles.

SUMMARY OF THE INVENTION

It is an object of the present invention to provide a method for preparing phosphors (e.g., orthosilicate phosphors) having superior brightness and efficiency.

It is also an object of the present invention to provide a method for preparing phosphors (e.g., orthosilicate phosphors) particularly adapted for use in low voltage operation (e.g., less than 5 kV) in applications such as flat panel displays, field emitter displays (FEDs), plasma displays, phosphor components for electroluminescent displays (ELDs), screens for TVs, field emission and plasma displays that do not have conventional screens (i e., luminescent components built into or on the substrate), x-ray imaging displays (in lieu of photographic plates), a phosphor screen, or a detector for x-ray or charged particles, and the like.

It is another object of the present invention to provide a method for preparing phosphors (e.g., orthosilicate phosphors) having a relatively uniform crystal structure and stoichiometry so as to achieve efficient emission of light.

It is yet another object of the present invention to provide a method for preparing phosphors (e.g., orthosilicate phosphors) exhibiting continued higher brightness and/or luminous efficiency with increasing voltage.

It is a further object of the present invention to provide a method for preparing phosphors (e.g., orthosilicate phosphors), wherein the method provides more favorable conditions (e.g., shorter firing duration) for the homogenous fusion of the precursors than that used in the manufacture of commercial orthosilicate-based phosphors.

These and other objects of the present invention are achieved by adding solid particle precursors to an activator ion-doped alkoxide solution, inducing a sol-gel condensation, drying the mixture, and then calcinating (or firing) the resulting mixture. Thus, in one aspect, the present invention provides a method for preparing phosphors comprising the steps of:

(a) providing a solution comprising an alkoxide precursor and a dopant precursor;
(b) mixing said solution with a solid particle precursor;
(c) inducing a sol-gel condensation reaction to form a sol-gel condensation reaction mixture;
(d) drying the sol-gel condensation reaction mixture; and
(e) firing the dried reaction mixture at a temperature sufficient to form phosphors.

In other aspects, phosphor products made in accordance with the present invention are also contemplated.

DESCRIPTION OF THE PREFERRED EMBODIMENTS

Figure 1:
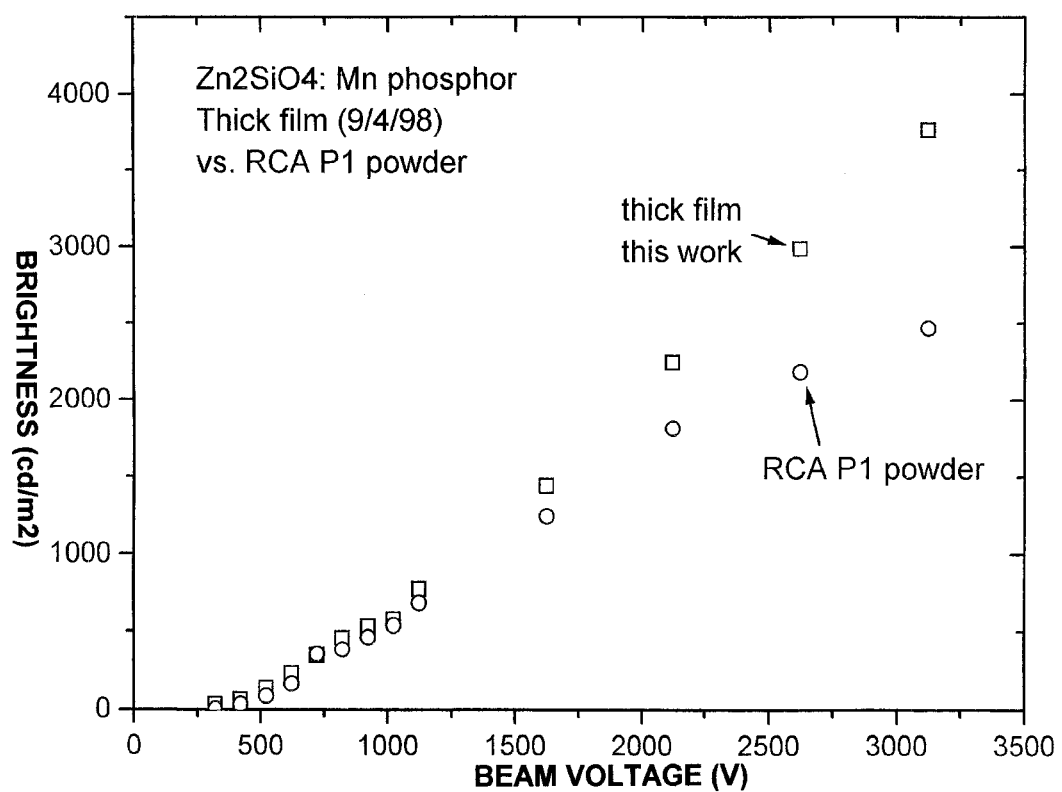
FIG. 1 compares the brightness (cd/m$^2$) of the $Zn_2SiO_4$:Mn phosphor of inventive Example 1 against a commercial $Zn_2SiO_4$:Mn phosphor (RCA P1) at various beam voltages.

It has been discovered that, in comparison to conventional or commercial phosphor production technology, the present invention achieves a different and a more favorable condition for the homogeneous fusion of the precursors. In this invention, solid particle precursors (e.g., $SiO_2$ nanocrystals) are initially mixed with a solution of an alkoxide precursor (e.g., zinc alkoxide) and a dopant precursor (e.g., manganese alkoxide), at suitable concentrations and proportions, before solid oxide (e.g., ZnO and MnO) particles form. A sol-gel hydrolysis-condensation reaction is then induced in the presence of the solid particle precursor so as to permit the formation of a coating of a doped alkoxide gel polymer around each solid particle 19 precursor. It should be noted that the coating may, but not necessarily, have non-uniform thickness around the solid particle. In the drying and firing process, an oxide shell, in complete contact with the solid particle precursor, is formed. Thus, the contact area is much larger than in the case when the synthesis involves mixing of solid precursor particles. In particular, a lower temperature, a much shorter solid reaction time as well as superior homogeneity can be expected.

In the present invention, a solution containing at least an alkoxide precursor and a dopant precursor is first provided. Typically, but not necessarily, the solution also comprises a hydrolysis agent and/or a reagent capable of inhibiting premature condensation reaction in the solution prior to the addition of the solid particle precursor.

The alkoxide precursor can be any alkoxide that can form a phosphor and is suitably a metal alkoxide. Such metal alkoxide precursors include, but are not limited to zinc alkoxides. When zinc alkoxide(s) are selected, they may be selected from zinc methoxide, zinc ethoxide, zinc propoxide, zinc butoxide, and others.

There is also no limitation with respect to the dopant precursor, so long as a phosphor can be produced. Typically, the dopant is selected from an acetate, an alkoxide, an organometallic compound, or an inorganic salt of the metal (dopant ion), and mixtures thereof. (Good results have been obtained using metal alkoxides such as manganese methoxide, as well as acetates such as europium acetate; successful results would also be expected for other dopant precursor species such as manganese nitrate.

The solvent is any liquid that can provide a solution of the above-described alkoxide precursor, dopant precursor, and other optional reagents without interfering with the subsequent sol-gel reactions. Usually, the solvent is an organic solvent such as 2-methoxyethanol or ethanol.

If present in the initial solution, the hydrolysis agent can be selected from various compounds such as water, tetramethylammonium hydroxide or mixtures thereof.

Additionally, a reagent capable of preventing premature hydrolysis and/or condensation reactions in the initial solution is desirably present. If present, it may selected from various compounds such as nitric acid, hydrochloric acid, and mixtures thereof.

The order of adding the components of the solution is also not limited. Typically, the alkoxide precursor and the dopant precursor are dissolved in the solvent and refluxed for an appropriate time. Then, additional solvent, hydrolysis agent and/or a reagent capable of preventing hydrolysis may be added continuously or incrementally. The resulting solution is usually transparent and remains stable for an extended period of time (e.g., 30 days).

The amount of the various components in the solution is not particularly limited and can be determined on a case-by-case basis by one skilled in the art. Typically, the amounts of the alkoxide precursor and the dopant precursor are such that the molar ratio of the dopant precursor to the alkoxide precursor is from about $1/100$ to about $5/100$. The amount of solvent can range from about 1,000 to about 100,000 ml per mole of alkoxide precursor. Further, the amount of the hydrolysis agent may range from about 0 to about 10 moles per mole of alkoxide precursor and depends on the number of alkoxide groups per precursor molecule, while the amount of the reagent capable of preventing premature hydrolysis and/or condensation (i.e., prior to step (b) in the method above) in the solution may range from about 0 to about 1 mole per mole of alkoxide precursor. There is an optimal dopant to host metal ratio, usually determined empirically as a tradeoff between having enough dopants for light output and not having enough dopant that they quench themselves through non-radiative channels. Too much hydrolysis agent may induce premature or immediate sol-gel condensation reaction, while too much condensation inhibitor may prevent the condensation reaction altogether.

After the solution containing at least the alkoxide precursor and the dopant precursor is provided, a solid particle precursor is then added. Typically, the solid particle precursor is nanoparticulate, although particles in the micron range may be used. By the term "nanoparticulate" and "nanoparticles," it is meant that the particles have a greatest dimension of about 10,000 nm or less, and should be as small in size as possible, preferably less than 10 nm. Typically, these nanoparticles may be silica, metal oxide, metal sulfide, metal oxysulfide, metal halide, metal carbonate, metal phosphate, metal sulfate, semiconductor-oxide (e.g., germanium oxide), pure metal or mixtures thereof. Specifically, silica such as fumed silica, $V_2O_5$, $Y_2S_3$, $GdOS_2$, ZnO, $GdS_3$, $La_2O_3$, $Al_2O_3$, CdS, and the like may be used. With respect to silica, AEROSIL® fumed silica from Degussa Corporation can be used. The amount of solid particle precursor usually is close to the stoichiometric amount determined by the phosphor compound, although the proportions for optimal light output are to be adjusted (or fine-tuned) empirically. Obviously, if the proportions are too far off, the desired phosphor compound and crystal structure cannot be formed properly.

It should be noted that the mixing of the solid particle precursor and the solution is preferably performed under conditions preventing any condensation reactions. Preferably, the mixture is subjected to treatment such as ultrasonication to ensure good dispersion of the solid particle precursor. If a hydrolysis agent is not included in the solution of the alkoxide precursor and the dopant precursor, it may be added at any point during or after the mixing of the solid particle precursor and the solution. For example, the solution of the first precursor alkoxide and the dopant alkoxide can be made first without the addition of $H_2O$ (or another alternative hydrolysis reagent). The solid particle precursor is then mixed with the solution, followed by the addition of $H_2O$ (or another hydrolysis reagent) with or without any additional stabilization (i.e., inhibiting) reagents.

After the mixing of the solid particle precursor and the solution is complete, a sol-gel condensation reaction is initiated. This is usually accomplished by subjecting the mixture to a temperature from about 50° C. to several hundred degrees ° C. for several minutes to several hours. At this point, a polymeric alkoxide gel is formed around each particle of the solid particle precursor.

It should be understood here that additional or optional components and/or ingredients may be added at an appropriate point in the process of the present invention. For example, it may be desirable to incorporate an alcohol, such as ethanol, in the mixture (after the sol-gel condensation has taken place) of the present invention to promote drying and spreadability of the mixture on a substrate. If used, the optional alcohol may be present in an amount of from about 1,000 to about 10,000 ml/mole of alkoxide precursor. If too much optional alcohol is used, not enough material may be transferred or processed per layer.

The mixture containing the polymeric alkoxide gel is then subject to drying and firing to form the phosphors of the present invention. In one embodiment, the mixture containing the gel is first spread uniformly over a substrate (e.g., a metal plate, quartz plate, or the unpolished side of a silicon wafer) to form a film. Conventional techniques such as dipping, spin-coating, and other methods may be used to apply the gel on the substrate. After the layer is applied, the film is dried at about 100 to about 300° C. for a few minutes, either continuously under the same conditions or stepwise under different conditions. More than one layer may be deposited on the substrate.

The film is then fired at about 800 to about 1,400° C., depending on the phosphor compound, for about 0.25 to about 1 hour to obtain the final phosphor product. The temperature will depend on the nature of the solid precursors and is determined by their fusion and solid state reactions.

As would be apparent to one skilled in the art, the present invention is not restricted to the formation of thick films as described in the embodiments earlier. Instead of drying the precursor mixture on a substrate, the mixture of the solid particle precursor (e.g., silica nanopowder) and the doped-alkoxide solution, first mixed at room temperature prior to sol-gel condensation reactions, can simply be heated to some elevated temperature such as 150° C. in a crucible to evaporate the solvent and complete the sol-gel condensation reaction, followed by similar procedures of heating and calcination in oxygen. The resulting solid can be ground and be used directly as a phosphor powder.

The same approach used in this invention can be applied to the preparation of any phosphor for which one of the precursors, excluding the dopant precursor, is in solid particle (typically nanoparticle) form and the other precursors exist in or can be converted to alkoxides in solution form. The important factor is to mix the precursors before any precipitation or condensation has occurred in the alkoxide solution. Blue, green, and red phosphors are contemplated herein. Blue phosphors include, but are not limited to, $Y_2SiO_5$:Ce, which can be made from yttrium alkoxide, cerium alkoxide, and $SiO_2$. Green phosphors include, but are not limited to, $ZnSiO_4$:Mn, which can be made from zinc alkoxide, manganese alkoxide, and $SiO_2$. Red phosphors include, but are not limited to $Y_2O_2S$:Eu, which can be made from yttrium alkoxide, europium acetate, and $Y_2S_3$. Of course, other species are also contemplated. For a $YVO_4$:Eu phosphor, a Y-Eu alkoxide solution is first made and stabilized against premature condensation. Then $V_2O_5$ nanoparticles are mixed with the Y-Eu alkoxide solution. Sol-gel condensation is then induced, followed by the drying and calcination at suitable temperatures.

As described previously, the solid particle precursor can be larger than 0.1 micron size (exceeding the nanometer size regime). Advantage can still be gained by the intimate contact between the particle and the shell of other oxides surrounding it before calcination.

Additionally, instead of using distinct particle precursors, aerogel precursors which comprise high porosity structures made of interconnected nanoparticles can be used. The high porosity, up to 99%, provides the extremely high surface/volume ratio required for high surface contact between the solid precursor and the surrounding oxide shell.

EXAMPLES

The following examples illustrate certain embodiments of the present invention. However, they are not to be construed to limit the scope of the present invention in any way.

Example 1
(A) Preparation of Mixed Zn-Mn Alkoxide Solution:
A mixture of 1.0136 g of zinc butoxide and 0.0101 g of manganese methoxide at a molar ratio of Mn/Zn=0.018 was dissolved in 10.0 ml of 2-methoxyethanol and refluxed for 1 hour at 80° C., under nitrogen flow, to give a clear, light brown 0.48 M (Zn) solution (stock). A mixture of 19.0 ml of 2-methoxyethanol, 0.15 ml of water and 0.02 ml of nitric acid (the latter being a reagent for inhibiting premature hydrolysis and condensation) was added to 5.0 ml of the stock solution to give a final 0.1 M (Zn) solution. The solution remained transparent with no precipitation. The solution remained clear and stable for many as weeks.
(B) Introduction of the Silica Nanoparticles:
0.010 g of AEROSIL® 150 ($SiO_2$, 7 nm diameter, Degussa Corporation) was introduced into 3.70 ml of the above 0.1 M alkoxide solution (in a proportion with a molar ratio of Si/Zn=0.45) at room temperature and ultrasonicated for dispersion of the AEROSIL® 150 particles. At this point no condensation reaction had taken place, as evidenced by the settling of the AEROSIL® 150 particles over a relatively short time and the solution above them remained clear.
(C) Initiation of Sol-Gel Condensation Reactions:
The mixture in (B) was heated to and maintained at 80° C. while being agitated. In about 90 minutes the solution became homogeneous and translucent.
(D) Preparation of Mixed Thick Film:
(1) A fixed small quantity of the mixture in (C) was spread as uniformly as possible over the back unpolished side of a 1×1 cm piece of silicon wafer at room temperature and then dried at 100° C. for 5 minutes, followed by further drying at 200° C. for 5 minutes in room atmosphere.
(2) A second layer of the material was added on top of the layer in (1) using the same dispensing and drying procedure. It should is be noted at this point that as many layers as desired could be added. In this example, a 40 layer thick film was built up using the same procedure.
(3) The thick film in (2) was heated in a quartz tube oven under flowing oxygen for 30 minutes at 350° C. The temperature was then increased to 1050° C. over 1.5 hours and maintained at this temperature for 15 minutes. The oven was then turned off to allow a slow cooling down to room temperature.

Example 2
(A) Preparation of the Mixed Zn-Mn alkoxide Solution:
The same solution as in Example 1 (A) was used
(B) Introduction of the Silica Nanoparticles:
The same procedure used in Example 1 (B) was used except that the Si/Zn molar ratio was 0.5.
(C) No Initial Heating:
The mixture in (B) was kept at room temperature. The solution, except for the silica powder, remained clear.
(D) Preparation of Thick Mixed Film:
(1) The mixture in (C) was shaken to ensure uniform dispersion of the silica powder before dispensing in the same manner as in Example 1 (D) (1), except drying was performed at about 100° C.
(2) A thick film consisting of 6 layers was made by repeating (1) six times.
(3) The thick film in (2) was heated in a quartz tube oven under flowing oxygen at 875° C. for 30 minutes. It was then cooled slowly to room temperature.

Example 3
An eight-layer thick film on a Pt film-coated silicon substrate (polished side) was made using otherwise the same procedures and conditions as in Example 2.

Cathodoluminescence Measurements

Cathodoluminescence (CL) properties of the thick films made in Examples 1 through 3 were observed, and the CL for the thick film made in Example 1 was measured at an electron beam voltage of 320–3120 volts using a Minolta CS-1000 spectroradiometer and processed with ND filter compensation and wavelength calibration. The chromaticity parameter (CIE 1931) were measured to be x=0.2065, y=0.7122. The brightness and the luminous efficiency are plotted in FIGS. 1 and 2, respectively.

In comparative studies, to account for possible differences due to substrates and other factors, a powder film of the commercial $Zn_2SiO_4$:Mn (RCA P1 phosphor from Sarnoff Corporation) was placed on the same type of silicon substrate. The thickness of the commercial phosphor film was intentionally made to be much thicker than the thick film in Example 1 above. In this regard, it is known that the film should be sufficiently thick so that none of the inducing electrons travel through the film without colliding with the phosphors, although it is also known that there would be no difference beyond a certain thickness. The two substrates were adhered side by side using a conductive glue on a chrome-coated glass plate mounted on a translation stage in the vacuum system. The cathodoluminescence was measured on the thick film, followed by a translation to the commercial film, and subsequent CL measurement without changing any electron beam parameters. Then the electron beam voltage was adjusted to additional values and the same comparative CL measurements were taken. No charging problem in either film was observed even at the lowest beam voltage used.

Although CL measurements for the phosphors of Examples 2 and 3 were not undertaken, these phosphors visibly exhibited a distinct luminescence similar to that of Example 1.

Figure 2:
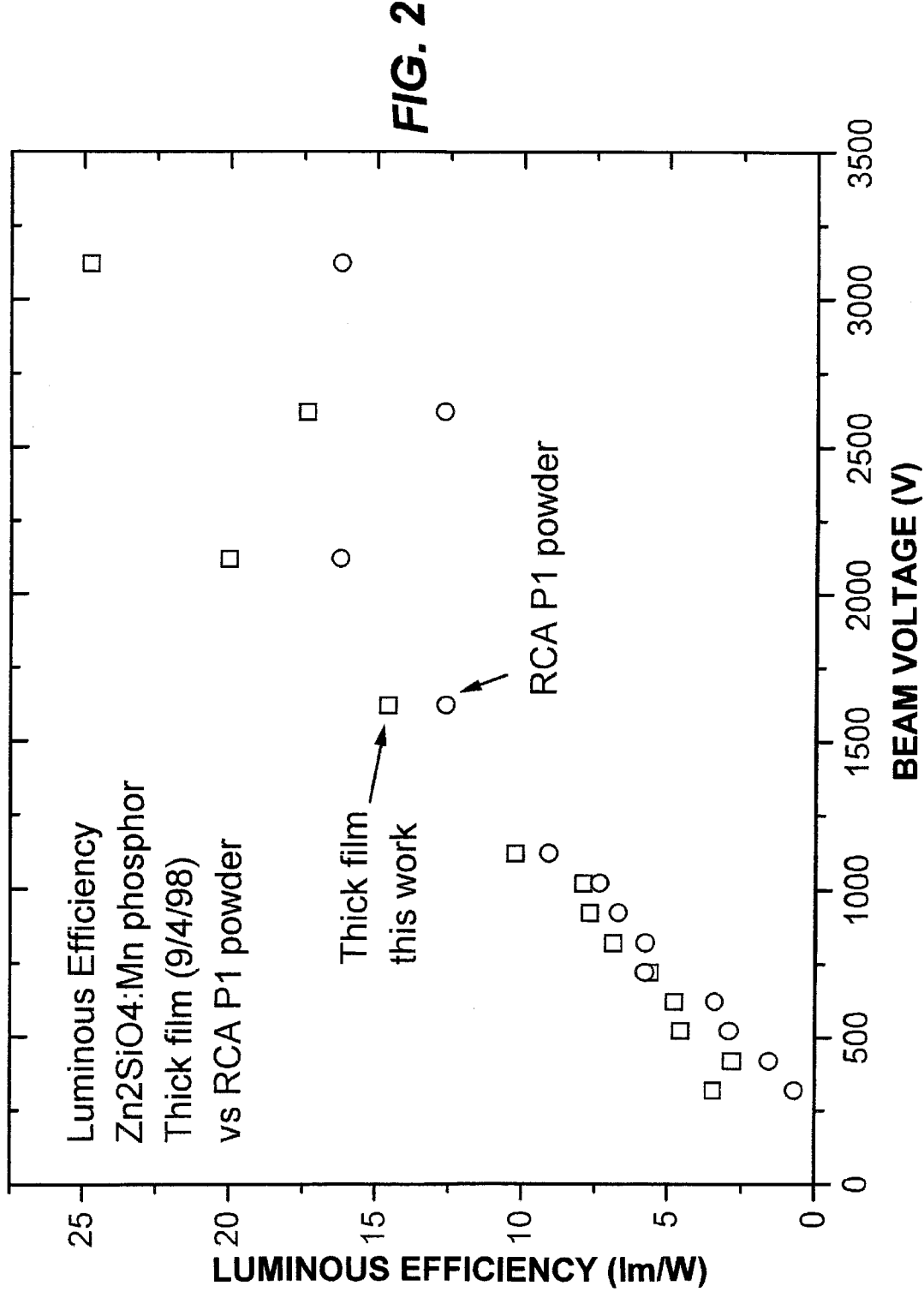
FIG. 2 compares the luminous efficiency (1 m/W) of the $Zn_2SiO_4$:Mn phosphor of inventive Example $_1$ against a commercial $Zn_2SiO_4$:Mn phosphor (RCA P1) at various beam voltages.

As shown in FIGS. 1 and 2, the present invention represents a new and improved method for manufacturing orthosilicate-based phosphors having high cathodoluminescence, i.e., brightness and luminous efficiency, at low electron beam voltages. For example., the thick film made in Example 1, far from being optimized, has already outperformed the commercial phosphor at all voltages up to the highest (3120V) studied. Especially significant for the phosphors of the present invention are the much higher luminous efficiencies at the low voltages and the continued linear rise in brightness with increasing voltage. By contrast, the brightness and the luminous efficiency of the commercial RCA P1 phosphor begins to level off. Specifically, at 320 volts, the luminous efficiency is 3.45 lm/watt for the thick film of the present invention, whereas it is only 0.73 lm/watt for the RCA P1 powder film. At 520 volts, the corresponding efficiencies are 4.54 lm/watt and 2.94 lm/watt for the inventive thick film and the RCA P1 powder film, respectively. For most commercial phosphors, the brightness and luminous efficiency tend to level off at higher voltages. On the other hand, in the present invention, the brightness continues to increase linearly and the efficiency levels off much more slowly at the higher voltages.

What is claimed is:

1. A method for preparing phosphors comprising the steps of:
   (a) providing a solution comprising an alkoxide precursor and a dopant precursor;
   (b) mixing said solution with a solid particle precursor, wherein said solid particle precursor have an average particle size of from about 2 to about 10,000 nm;
   (c) inducing a sol-gel condensation reaction to form a sol-gel condensation reaction mixture;
   (d) drying the sol-gel condensation reaction mixture; and
   (e) firing the dried reaction mixture at a temperature sufficient to form phosphors.

2. The method according to claim 1, wherein said solution further comprises a hydrolysis agent.

3. The method according to claim 1, wherein a hydrolysis agent is added after said step (b).

4. The method according to claim 3, wherein said hydrolysis agent is added immediately before step (c).

5. The method according to claim 1, wherein said solution further comprises a reagent capable of inhibiting condensation reactions before step (b) in said solution.

6. The method according to claim 2, wherein said hydrolysis agent is selected from the group consisting of water, tetramethylammonium hydroxide, and mixtures thereof.

7. The method according to claim 3, wherein said hydrolysis agent is selected from the group consisting of water, tetramethylammonium hydroxide, and mixtures thereof.

8. The method according to claim 1, wherein said dopant precursor is an alkoxide, an acetate, an organometallic compound, an inorganic salt, or mixtures thereof.

9. The method according to claim 1, wherein said solid particle precursor is silica, metal oxide, metal sulfide, metal oxysulfide, metal halide, metal carbonate, metal phosphate, metal sulfate, $GeO_2$, pure metal or mixtures thereof.

10. The method according to claim 9, wherein said solid particle precursor is fumed silica.

* * * * *